(12) United States Patent
Frait et al.

(10) Patent No.: US 9,783,049 B2
(45) Date of Patent: Oct. 10, 2017

(54) TRANSMISSION HAVING POWER TAKE-OFF

(71) Applicant: Ford Global Technologies, LLC, Dearborn, MI (US)

(72) Inventors: Steven Anatole Frait, Milan, MI (US); Laurence Andrew Deutsch, Farmington Hills, MI (US); Gregory Daniel Goleski, Rochester Hills, MI (US); Jeffrey Edward Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 14/879,247

(22) Filed: Oct. 9, 2015

(65) Prior Publication Data

US 2017/0101004 A1 Apr. 13, 2017

(51) Int. Cl.
| | | |
|---|---|---|
| *F16H 37/00* | (2006.01) | |
| *B60K 17/28* | (2006.01) | |
| *B60K 17/02* | (2006.01) | |
| *B60K 17/10* | (2006.01) | |
| *F16H 57/025* | (2012.01) | |
| *F02B 67/04* | (2006.01) | |
| *F16H 57/04* | (2010.01) | |
| *F16H 57/02* | (2012.01) | |

(52) U.S. Cl.
CPC ............. *B60K 17/28* (2013.01); *B60K 17/02* (2013.01); *B60K 17/10* (2013.01); *F02B 67/04* (2013.01); *F16H 57/025* (2013.01); *F16H 57/0441* (2013.01); *F16H 2057/02026* (2013.01)

(58) Field of Classification Search
CPC ................................ F16H 55/18; B60K 17/28
USPC ...... 180/53.6, 53.7, 53.61, 53.8; 74/11, 15.8, 74/15.82, 15.84
See application file for complete search history.

(56) References Cited

U.S. PATENT DOCUMENTS

| | | | |
|---|---|---|---|
| 4,724,720 A | 2/1988 | Ohkubo | |
| 5,122,100 A * | 6/1992 | Carriere | B60K 5/04 475/198 |
| 6,962,093 B2 | 11/2005 | Warner | |
| 7,673,534 B2 | 3/2010 | Prampolini | |

(Continued)

FOREIGN PATENT DOCUMENTS

| | | |
|---|---|---|
| KR | 10078532581 B1 | 12/2007 |
| WO | 2014124221 A2 | 8/2014 |

*Primary Examiner* — Toan To
(74) *Attorney, Agent, or Firm* — James Dottavio; Brook Kushman, P.C.

(57) ABSTRACT

A transmission includes an input shaft, and a primary drive gear fixed to the input shaft. The primary gear has a first set of gear teeth. An idler gear is disposed in the transmission and has a second set of gear teeth in meshing engagement with the first set of gear teeth. The transmission also includes a transmission-pump drive gear having a third set of gear teeth in meshing engagement with the second set of gear teeth. The transmission-pump drive gear is configured to transmit power from the input shaft to a transmission pump. A power take-off unit is mounted to a case of the transmission and includes a first unit drive gear having a fourth set of gear teeth in meshing engagement with the second set of teeth. The a first unit drive gear is configured to transmit power from the idler gear to the power take-off.

19 Claims, 2 Drawing Sheets

(56) References Cited

U.S. PATENT DOCUMENTS

| | | | |
|---|---|---|---|
| 7,765,884 B2* | 8/2010 | Frait | B60K 17/28 74/15.84 |
| 9,067,492 B2 | 6/2015 | Hairston et al. | |
| 2006/0150757 A1* | 7/2006 | Nishino | B60K 17/105 74/11 |
| 2007/0017729 A1* | 1/2007 | Nishimoto | B60K 17/08 180/374 |
| 2008/0141800 A1* | 6/2008 | Seitz | A62C 25/005 74/15.82 |
| 2009/0114045 A1 | 5/2009 | Wilson et al. | |
| 2014/0026690 A1 | 1/2014 | Hairston | |
| 2014/0238757 A1* | 8/2014 | Sagawa | B60K 17/28 180/53.6 |
| 2015/0068824 A1* | 3/2015 | Matsuura | B60K 17/105 180/53.4 |
| 2015/0239344 A1* | 8/2015 | Iwaki | B60K 17/04 180/6.48 |
| 2016/0102445 A1* | 4/2016 | Kobiki | B60K 17/10 180/53.4 |

\* cited by examiner

TRANSMISSION HAVING POWER TAKE-OFF

TECHNICAL FIELD

This disclosure relates to the field of automatic transmissions for motor vehicles. More particularly, the disclosure relates to a transmission having at least one power take-off.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Most transmissions are equipped with a torque converter or other type of launch device. When the vehicle is stationary or moving very slowly, the gearbox input speed is less than the minimum operating speed of the engine. A launch device transmits torque from the engine to the gearbox input while permitting the engine to rotate at an acceptable speed. A torque converter includes an impeller driven by the engine and a turbine driving the gearbox input. Torque is transferred from the impeller to the turbine hydro-dynamically.

Some types of vehicles need substantial amounts of power to run accessories in addition to the power required to propel the vehicle. These vehicles may use one or more accessory drive units, which may be called power take-off (PTO) units, mounted to the transmission to provide this accessory power. If the accessory drive is connected to the turbine, then it only rotates when the vehicle is moving. Although this is acceptable for some types of accessories, other types of accessories require power when the vehicle is stationary.

SUMMARY

According to one embodiment, a transmission includes an input shaft, and a primary drive gear fixed to the input shaft. The primary gear has a first set of gear teeth. An idler gear is disposed in the transmission and has a second set of gear teeth in meshing engagement with the first set of gear teeth. The transmission also includes a transmission-pump drive gear having a third set of gear teeth in meshing engagement with the second set of gear teeth. The transmission-pump drive gear is configured to transmit power from the input shaft to a transmission pump. A power take-off unit is mounted to a case of the transmission and includes a first unit drive gear having a fourth set of gear teeth in meshing engagement with the second set of teeth. The a first unit drive gear is configured to transmit power from the idler gear to the power take-off.

According to another embodiment, a transmission includes a primary drive gear fixed to an input shaft, and an idler gear in meshing engagement with the primary drive gear. A transmission pump is driven by a pump shaft that receives power from the idler gear. A power take-off unit is mounted to a case of the transmission and has a first unit drive gear in meshing engagement with the idler gear.

According to yet another embodiment, a transmission includes a case defining a window and having a boss that surrounds the window. The boss is configured to connect with an accessory drive unit. The transmission also includes a primary drive gear fixed to an input shaft, and a transmission pump operably coupled to a first gear. An idler gear is disposed within the case and meshing with the primary drive gear and the first gear. The idler gear is arranged in the case such that a gear of the accessory drive unit meshes with the idler gear when the accessory drive unit is mounted on the boss.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
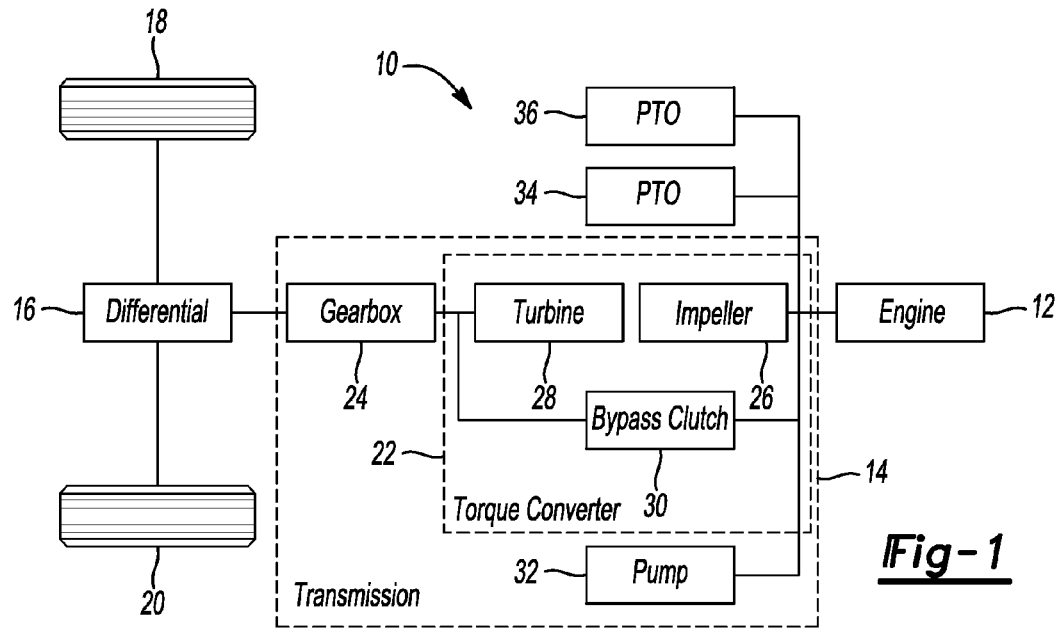
FIG. 1 is a schematic diagram of the vehicle powertrain with two accessory drives.

An exemplary vehicle powertrain 10 is illustrated schematically in FIG. 1. In FIG. 1, solid lines represent mechanical connections such as shafts or fixed ratio gearing. The engine 12 generates mechanical power by burning fuel. The transmission 14 transmits the power to a differential 16 at a shaft speed suited to current vehicle needs, which may be faster or slower than the shaft speed at which engine 12 generates the power. The differential 16 reduces the shaft speed by a fixed final-drive ratio and transmits the power to the left and right driving wheels 18 and 20, allowing for slight speed differences between the wheels as the vehicle turns a corner.

The transmission 14 may include a torque converter 22 or other launch device and a gearbox 24. The torque converter 22 includes an impeller 26 that is fixed to the engine crankshaft and a turbine 28 that is fixed to the gearbox input shaft. Torque is transferred hydro-dynamically from the impeller 26 to the turbine 28 when the impeller 26 rotates faster than the turbine 28. A bypass clutch 30 may be engaged to transfer torque by friction from the impeller 26 to the turbine 28 to reduce the power loss inherent in the hydro-dynamic power transfer. The gearbox 24 includes a number of hydraulically-actuated shift elements. The gearbox 24 establishes different speed ratios by engaging various subsets of the shift elements. The transmission pump 32 provides pressurized fluid that engages the shift elements. Some of the power generated by engine 12 is used to drive the transmission pump 32, reducing the power delivered to the differential 16. In order to maximize the percentage of power delivered to the differential 16 and thus reduce the amount of fuel consumed by engine 12, it is desirable to minimize the power consumption of transmission pump 32.

Power take-off units (PTO) 34 and 36 are power consuming devices added by vehicle operators, typically after purchasing the vehicle. The power take-off units are also known as accessory drives. The PTOs are mounted to the transmission structure using mounting hardware that may be provided by the transmission manufacturer. The PTOs 34 and 36 are powered by the engine 12 indirectly through the transmission 14. Some types of accessories require power only when the vehicle is moving, other types require power only when the vehicle is stationary, and yet other types require power in both circumstances.

For example, the vehicle engine can provide power for various accessories at remote worksites by way of vehicle-mounted electric generators, hydraulic pumps, and air compressors. These accessories are only utilized when the truck is in park. A vehicle-mounted refrigeration compressor must work while the vehicle is travelling and while the vehicle is parked. When a truck is used for snow removal, a transmission-mounted PTO may provide the power to raise and lower the snowplow. The driver would like to be able to raise and lower the plow while moving, while stopped with the vehicle in gear, and while in park.

Figure 2:
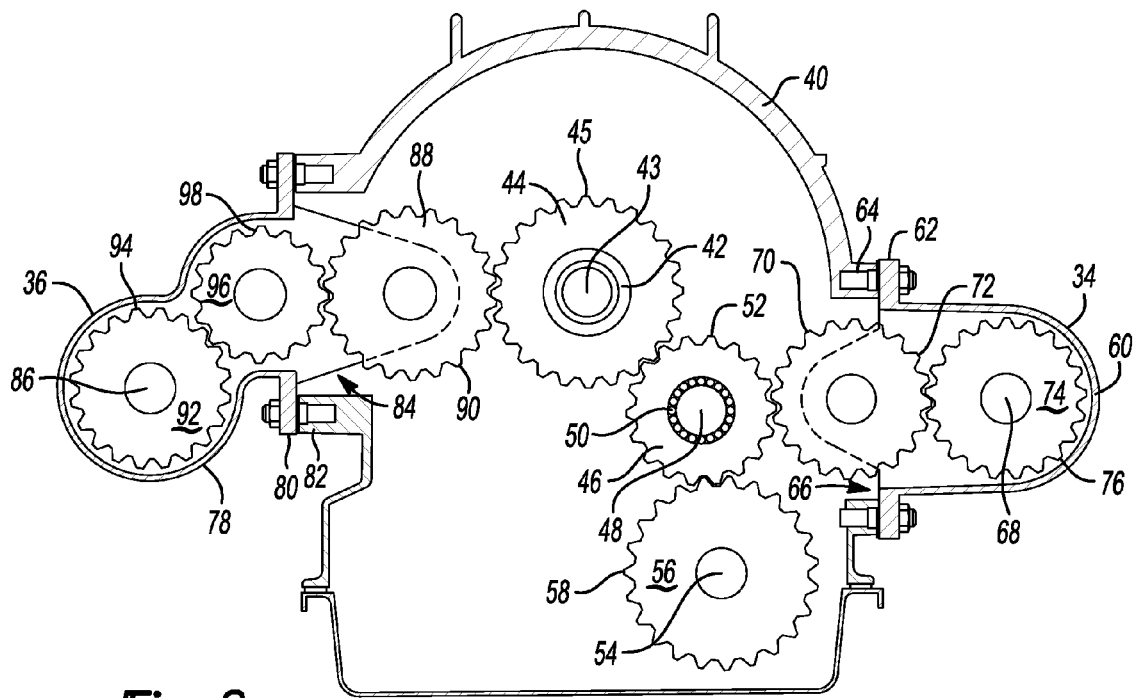
FIG. 2 is a front view, in cross section, of the transmission and accessory drives of FIG. 1 along a cut line behind the torque converter.
Figure 3:
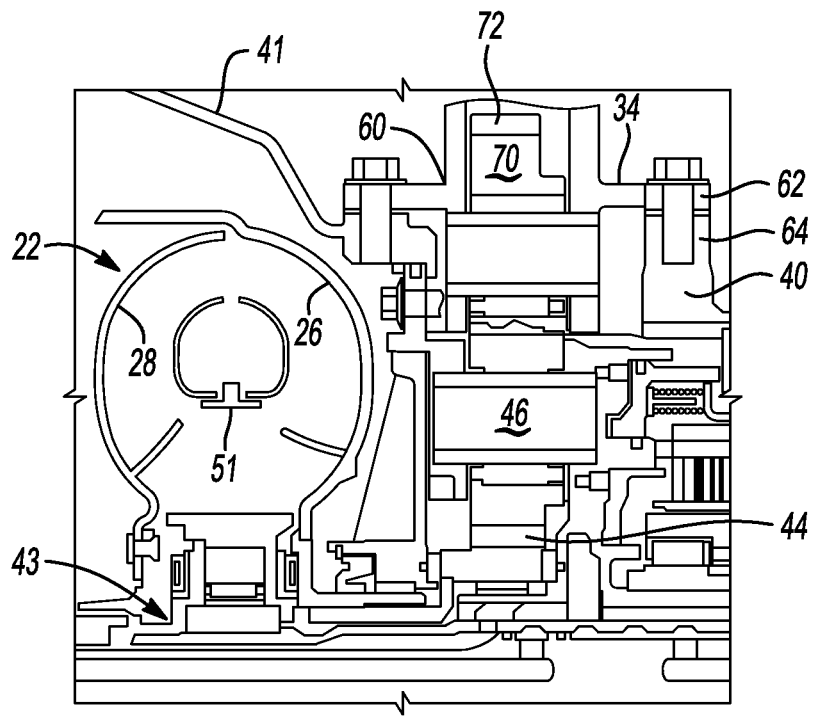
FIG. 3 is a diagrammatical view, in cross section, of a portion of the transmission.
Figure 4:
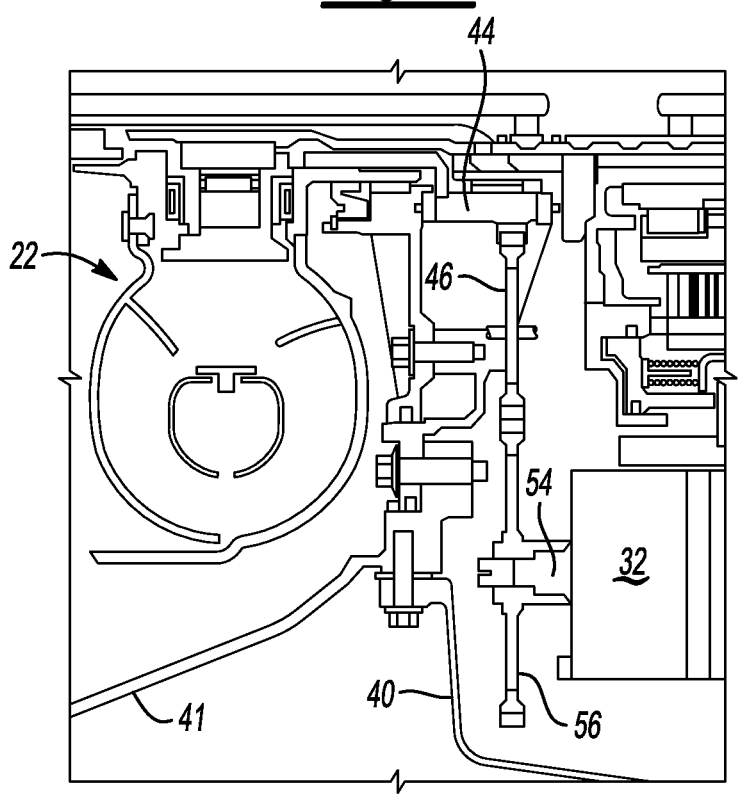
FIG. 4 is a diagrammatical view, in cross section, of another portion of the transmission.

FIGS. 2, 3, and 4 illustrate portions of the transmission 14 and the PTOs 34, 36. In FIGS. 3 and 4, the engine is to the left and the rear wheels are to the right. The transmission 14 includes a transmission housing (or case) 40 that may be one or more pieces assembled together. The torque converter 22 is located at the front of the transmission 14 and is disposed within a bell housing 41 that is either attached to the transmission housing 40, or is an integral part of the housing. The torque converter 22 includes the impeller 26 that is coupled to the crankshaft of the engine 12. The torque converter 22 also includes the turbine 28 that is connected to a turbine shaft 43. The turbine shaft 43 drives the gear box that includes one or more planetary gear sets and an arrangement of clutches controlled by a valve body. A stator 51 is disposed between the impeller 26 and the turbine 28.

A primary drive gear 44 is fixed on an input shaft 42 (powered by the engine) and includes gear teeth 45. The primary drive gear 44 is for powering the transmission pump 32, and the first and second PTOs 34, 36 (if installed). A first idler gear 46 is supported on a first idler shaft 48 that is supported by the transmission housing 40. Needle bearings 50 may be disposed between an inside bore of the gear 46 and the outer surface of the shaft 48. The gear 46 includes gear teeth 52 that are in meshing engagement with the gear teeth 45 of the primary drive gear 44 in order to transmit power from the input shaft 42 to the idler gear 46.

The transmission pump 32 may be an off-axis pump that is located at the lower-right side of the transmission 14. The transmission pump 32 includes a drive gear 56 fixed on a pump shaft 54 that powers the pump 32. The drive gear 56 has gear teeth 58 that are in meshing engagement with the gear teeth 52 of the idler gear 46 in order to transmit power from the idler gear to the pump shaft 54. In an alternative embodiment, one or more additional idler gears may mesh between gear 46 and the pump drive gear 56 in order to transmit power to the pump shaft 54.

The PTO 34 includes a housing 60 having flanges 62 that bolt onto bosses 64 of the transmission housing 40. The transmission housing 40 defines a window 66 allowing the gears of the PTO 34 to mesh with the gears inside the transmission housing 40. The PTO 34 includes a shaft 68 that is powered by the engine. The shaft 68 is operably coupled with an accessory and provides the driving force for the accessory. The accessory may include a clutch that selectively couples the shaft 68 with the accessory. A drive gear 74 is fixed to the shaft 68 and includes gear teeth 76. Idler gear 70 transmits power from idler gear 46 to the drive gear 74 and includes gear teeth 72 that mesh with the gear teeth 52 and the gear teeth 76. The idler gear 70 and the drive gear 74 are disposed on shafts supported by the PTO housing 60. The transmission housing 40 may include a cover that fastens to the bosses 64 when the PTO 34 is not installed. The idler gear 46 is arranged in the case 40 such that the gear 46 meshes with a gear of the PTO 34 when the PTO 34 is installed. For example, the idler gear 46 is disposed adjacent the window 66 on a same longitudinal half of the transmission 14 as the PTO 34.

The PTO 36 includes a housing 78 having flanges 80 that bolt onto bosses 82 of the transmission housing 40. The transmission housing 40 defines a window 84 allowing the gears of the PTO 36 to mesh with the gears inside the transmission housing 40. The PTO 36 includes a shaft 86 that is powered by the engine. The shaft 86 is operably coupled with an accessory and provides the driving force for the accessory.

A drive gear 92 is fixed to the shaft 86 and includes gear teeth 94. The PTO 36 may include one or more idler gears that operably couple with the primary drive gear 44 to transmit power from the primary drive gear 44 to the shaft 86. In one embodiment, the PTO 36 includes a first idler gear 88 and a second idler gear 96. The first idler gear 88 includes gear teeth 90 in meshing engagement with the gear teeth 45 of the primary drive gear 44. The second idler gear 96 includes gear teeth 98 in meshing engagement with gear teeth 94 and gear teeth 90. In other embodiments, more or less idler gears may be used to transmit power from the primary drive gear to the shaft 86. For example, the PTO 36 may include a single idler gear meshing with the primary drive gear 44 and the drive gear 92. The idler gears 88, 96 and the drive gear 92 are disposed on shafts supported by the PTO housing 60. The transmission housing 40 may include a cover that fastens to the bosses 82 when the PTO 36 is not installed. (While bearings are only illustrated on gear 46, it is to be understood that other gears may also include bearings.)

The first PTO 34 and second PTO 36 receive power via the input shaft 42. Therefore, the PTOs 34, 36 are able to power their associated accessories when ever the engine is running, regardless of whether the vehicle is moving or stationary. Power is also available regardless of whether the gearbox is in neutral, park, reverse, or a forward gear.

Referring back to FIG. 2, the gears are arranged such that all idler gears are loaded regardless of whether or not each of the PTOs 34, 36 are installed. In some prior art designs, an idler gear is unloaded when one or more of the PTOs are uninstalled. When unloaded, idler gears may rattle or move creating unwanted noise that is detectable by passengers of the vehicle. This noise leads to an unsatisfactory customer experience and should be avoided. In the illustrated design, the first idler gear 46 is always in meshing engagement with a gear configured to power the transmission pump 32. Thus, when the PTO 34 is removed, the idler gear 46 is still loaded, which prevents gear rattle and other unwanted noise. The illustrated gear arrangement also reduces the number of gears required to power each of the various components by providing a shared idler gear 46 for the transmission pump 32 and the PTO 34. This shared idler gear reduces weight, costs, and power losses. Other sources of gear rattle are also eliminated by supporting idler gear 70 and idler gear 88 with PTO housing 60 and PTO housing 78, respectively. Thus, idler gear 70 and idler gear 88 are only present in the transmission when their associated PTO is installed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
    an input shaft;
    a primary drive gear fixed to the input shaft and having a first set of gear teeth;
    an idler gear having a second set of gear teeth in meshing engagement with the first set of gear teeth;
    a transmission-pump drive gear having a third set of gear teeth in meshing engagement with the second set of gear teeth, wherein the transmission-pump drive gear is configured to transmit power from the input shaft to a transmission pump; and
    a power take-off unit mounted to a case of the transmission and including a first unit drive gear having a fourth set of gear teeth in meshing engagement with the second set of teeth, wherein the first unit drive gear is configured to transmit power from the idler gear to the power take-off.

2. The transmission of claim 1 wherein the power take-off unit further includes:
    a shaft selectively coupled to a first accessory; and
    a second unit drive gear fixed to the shaft and having a fifth set of gear teeth in meshing engagement with the fourth set of teeth.

3. The transmission of claim 1 further comprising a second power take-off unit mounted to the case of the transmission and including a second unit drive gear having a fifth set of gear teeth in meshing engagement with the first set of teeth.

4. The transmission of claim 3 wherein the second power take-off unit further includes:
    a shaft selectively coupled to a second accessory; and
    a second unit drive gear fixed to the shaft and having a sixth set of gear teeth in meshing engagement with the fifth set of teeth.

5. The transmission of claim 3 wherein the second power take-off unit further includes:
    a shaft selectively coupled to a second accessory;
    a third unit drive gear having a sixth set of gear teeth in meshing engagement with the fifth set of teeth; and
    a fourth unit drive gear fixed to the shaft and having a seventh set of gear teeth in meshing engagement with the sixth set of teeth.

6. A transmission comprising:
    a primary drive gear fixed to an input shaft;
    an idler gear in meshing engagement with the primary drive gear;
    a transmission pump driven by a pump shaft that receives power from the idler gear; and
    a power take-off unit mounted to a case of the transmission and including a first unit drive gear in meshing engagement with the idler gear.

7. The transmission of claim 6 further comprising a pump gear in meshing engagement with the idler gear and configured to transmit power to the pump shaft.

8. The transmission of claim 6 further comprising a pump gear fixed to the pump shaft and in meshing engagement with the idler gear.

9. The transmission of claim 6 further comprising a torque converter including a turbine and an impeller fixed to the input shaft.

10. The transmission of claim 6 wherein the power take-off unit further includes a second unit drive gear in meshing engagement with the first unit drive gear.

11. The transmission of claim 6 further comprising a second power take-off unit mounted to the case of the transmission and including a second unit drive gear in meshing engagement with the primary drive gear.

12. The transmission of claim 11 wherein the second power take-off further includes a third unit drive gear in meshing engagement with the second unit drive gear.

13. A transmission comprising:
    a case defining a window and having a boss that surrounds the window and is configured to connect with an accessory drive unit;
    a primary drive gear fixed to an input shaft;
    a transmission pump operably coupled to a first gear; and
    an idler gear meshing with the primary drive gear and the first gear, wherein the idler gear is arranged in the case such that a gear of the accessory drive unit meshes with the idler gear when the accessory drive unit is mounted on the boss, wherein the input shaft defines a centerline of the case splitting the case into a first longitudinal half and a second longitudinal half, and wherein the idler gear and the window are located within the first longitudinal half.

14. The transmission of claim 13 wherein the idler gear is arranged in the case such that at least a portion of the idler gear is adjacent to the window.

15. The transmission of claim 13 wherein the first gear is located within the first longitudinal half.

16. The transmission of claim 13 wherein the transmission pump further includes a shaft and the first gear is affixed to the shaft.

17. The transmission of claim 13 wherein the accessory drive unit is mounted to the boss and the gear of the accessory drive unit meshes with the idler gear.

18. The transmission of claim 13 further comprising a second accessory drive unit mounted to the case of the transmission and including a second accessory gear meshing with the primary drive gear.

19. The transmission of claim 13 wherein the gear of the accessory drive unit is arranged to extend through the window when the unit is mounted on the boss.

\* \* \* \* \*